United States Patent [19]

Nellen et al.

[11] Patent Number: 4,660,139

[45] Date of Patent: Apr. 21, 1987

[54] GENERATOR FOR GENERATING A HIGH D.C. VOLTAGE

[75] Inventors: Johannes H. M. Nellen; Frans Slegers; Johannes H. B. Otten; Johannus W. G. Kole, all of Eindhoven, Netherlands

[73] Assignee: U.S. Philips Corporation, New York, N.Y.

[21] Appl. No.: 795,800

[22] Filed: Nov. 7, 1985

[30] Foreign Application Priority Data

Dec. 6, 1984 [NL] Netherlands ........................ 8403704

[51] Int. Cl.[4] ............................................. H02M 7/06

[52] U.S. Cl. ..................................... 363/68; 363/126; 336/180

[58] Field of Search ......................... 363/68, 126, 144; 336/180, 185, 196, 198, 208; 315/411; 358/190

[56] References Cited

U.S. PATENT DOCUMENTS

Re. 31,119 1/1983 Mitani et al. ..................... 363/68 X
3,886,434 5/1975 Schreiner ............................ 363/68
4,156,888 5/1979 Takahashi ....................... 363/144 X
4,204,263 5/1980 Onoue .................................. 363/68
4,569,010 2/1986 Klokkers et al. ............... 363/126 X

*Primary Examiner*—Peter S. Wong
*Attorney, Agent, or Firm*—Thomas A. Briody; Jack Oisher; William J. Streeter

[57] ABSTRACT

The generator comprises a ferromagnetic core (1) having a primary winding (3) and a secondary winding which comprises a number of concentric secondary coils (7A–7F), which are wound with the same winding senses and have substantially the same number of turns and are provided with a layer of insulating material (9A–9E) between every two consecutive coils. The high-voltage portion of the generator is formed by a number of sections (19A, 19B, 19C), each of which comprises at least two series-arranged secondary coils (7A–7F), the number of secondary coils being equal for all sections and the last coil of each section being arranged in series with a rectifier (13A, 13B, 13C). All sections are arranged in series such that the rectifiers have the same forward directions.

7 Claims, 4 Drawing Figures

GENERATOR FOR GENERATING A HIGH D.C. VOLTAGE

BACKGROUND OF THE INVENTION

1. Field of the Invention

The invention relates to a generator for generating a direct voltage at a high-voltage terminal, comprising a transformer having a ferromagnetic material core, on which a primary and a secondary winding are provided, the secondary winding comprising a plurality of concentric secondary coils which are wound with the same winding senses and have substantially the same number of turns with a layer of insulating material between every two consecutive coils, the generator comprising a high voltage portion formed by a number of sections, each section comprising a portion of the secondary winding and a rectifier arranged in series with that portion, the sections being arranged in series such that all the rectifiers have the same forward directions, the last section in the arrangement being connected to the high voltage terminal.

2. Description of the Related Art

Such a generator is known from, for example, the periodical "Funkschau", 1976, Volume 24, pages 1051-1054. With this prior art generator each section of the high voltage portion is formed by a single secondary coil in series with a diode. At a given primary voltage the value of the generated direct voltage depends on the direct voltage generated per section and on the number of sections. From this it follows that for generating a high direct voltage either a large number of sections and consequently a large number of diodes are required or the number of turns per section and consequently the length of each secondary coil must be comparatively large, so that also the dimensions of the core must be large. Both increasing the number of diodes and increasing the dimensions of the core increase the cost.

SUMMARY OF THE INVENTION

The invention has for its object to provide a generator of the type described in the opening paragraph, which with a comparatively small size and/or a comparatively small number of rectifiers can generate approximately the same high voltage at a given primary voltage as the prior art generator.

According to the invention, the generator is therefore characterized in that each section comprises at least two series-arranged secondary coils, and that the number of secondary coils of each section is the same for all the sections.

Because of these measures the winding length of the coils in each section may be reduced by at least a factor of two less than for the known generator, whilst since the number of coil turns per section and consequently also the voltage generated per section remain the same the number of sections and consequently the number of rectifiers need not be increased. It is of course alternatively possible to reduce the number of sections and consequently the number of rectifiers, while maintaining the same winding lengths of the coils.

A preferred embodiment of the generator according to the invention, is characterized in that every two consecutive secondary coils belong to the same section or to sections which are immediately adjacent to each other. The direct voltage between any two consecutive secondary coils will therefore never exceed the direct voltage generated per section. Consequently, less stringent requirements need be imposed on the insulating material between consecutive secondary coils.

BRIEF DESCRIPTION OF THE DRAWINGS

The invention will now be described in greater detail by way of example with reference to the accompanying drawings. Therein.

DESCRIPTION OF THE PREFERRED EMBODIMENTS

Figure 1:
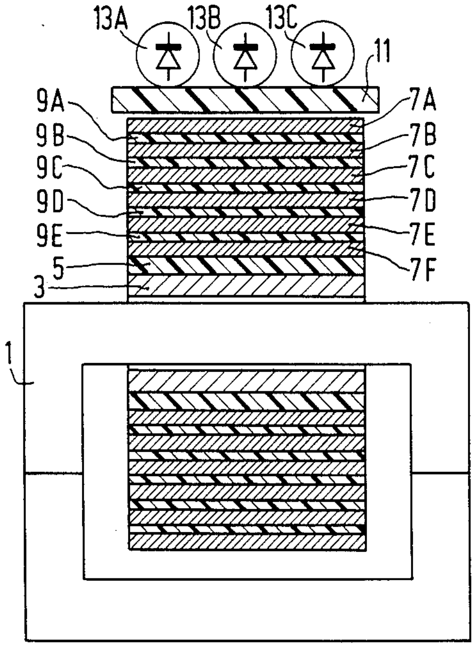
FIG. 1 illustrates schematically and in cross-sectional view the mechanical construction of a first embodiment of a generator according to the invention.

The generator shown schematically in FIG. 1 comprises a transformer having a core 1 of a ferromagnetic material, for example ferrite, on which a primary winding 3 is provided which may be constituted by a wire or strip-shaped conductor wound around a coil former (not further shown). The primary winding 3 is enclosed concentrically by a secondary coil former 5, on which a secondary winding is provided which in this embodiment has six concentric secondary coils 7A . . . 7F, which consist of electrically conductive wire and are wound in the same winding senses with substantially the same number of turns. A layer of insulating material 9A to 9E is arranged between every two consecutive secondary coils 7A . . . 7F, which layer consists, for example, of a plastics film material. A plastics support 11 on which three rectifiers in the form of semiconductor diodes 13A, 13B, 13C are provided, is arranged on the outer secondary coil 7A. Each of the coils and diodes has connecting leads, which are not shown in FIG. 1 for the sake of clarity.

Figure 2:
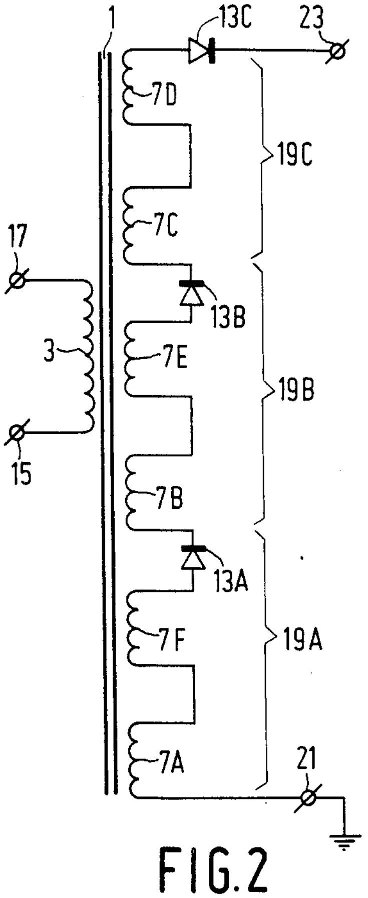
FIG. 2 shows a circuit diagram of the generator shown in FIG. 1.

FIG. 2 shows how the coils and diodes are inter-connected and connected to terminals. The primary winding 3 is connected to input terminals 15 and 17, which can be connected to, for example, a line deflection circuit in a television receiver. The secondary coils 7A . . . 7F and the diodes 13A, 13B, 13C together form a high voltage portion of the generator consisting of three sections 19A, 19B, 19C, each comprising first and second series-arranged secondary coils the second secondary coil of which is arranged in series with one of the diodes. The sections 19A, 19B, 19C are arranged in series such that all diodes have the same forward direction. The first secondary coil 7A of the first section 19A in the series arrangement is connected to a ground terminal 21 and the diode 13C of the last section 19C is connected to a high-voltage terminal 23. In the embodiment shown the secondary coils 7A . . . 7F are distributed as follows over the sections 19A, 19B, 19C: the first section 19A comprises as the respective first and a second coils the secondary coils 7A and 7F, respectively the second section 19B comprises the secondary coils 7B and 7E, respectively and the third section 19C comprises the secondary coils 7C and 7D, respectively.

The generator operates as follows. When a sequence of voltage pulses is applied to the generator via the input terminals 15, 17 a sequence of voltage pulses having a predetermined value U is generated in each turn of the secondary winding causing a sequence of voltage pulses of an approximately N-times higher value NU to be produced across each secondary coil 7A . . . 7F, wherein N is the number of turns per secondary coil. So a sequence of voltages having a value 2NU is produced across the two series-arranged secondary coils of each section. Thanks to the diode which forms part of the section, the section supplies a direct voltage whose value is approximately equal to 2NU. The direct voltage generated at the high voltage terminal 23 is the sum of the direct voltages generated by the three sections 19A, 19B, 19C and is consequently approximately equal to 6NU.

Figure 3:
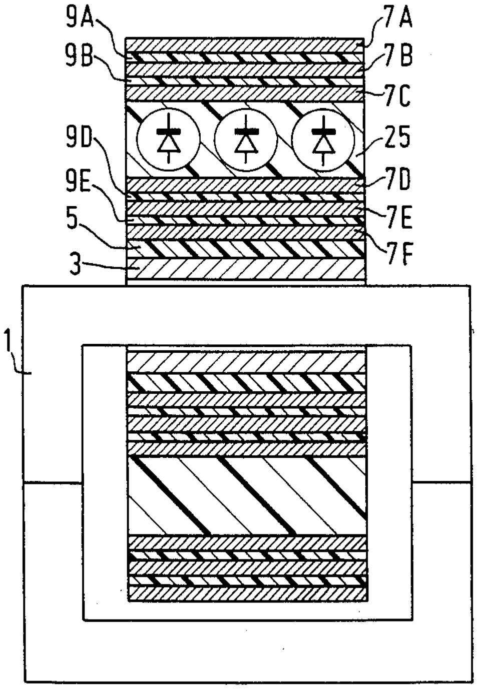
FIG. 3 illustrates a second embodiment of a generator as shown in FIG. 1

From the above it follows that each secondary coil carries a direct voltage with respect to the ground terminals 21, whilst at the same time voltage pulses occur which are very small at the beginning of each section and become increasingly larger near the end of each section. The value of the direct voltage level depends on to which section the relevant secondary coil belongs, whilst the value of the a.c. voltage (the voltage pulses) depends on whether a first or a second secondary coil is involved. When two first secondary coils are immediately adjacent to each other, as are, for example, the coils 7A and 7B, the a.c. voltage carried by the winding of these coils is substantially the same for both coils. When moreover the insulating layer 9A between these coils is comparatively thin and has a comparatively high dielectric constant, the capacity between these coils is so large that no a.c. voltage is produced between the two coils. This also holds for two consecutive second secondary coils such as the coils 7D and 7E. The insulating layers between coils of that type need not satisfy high requirements as regards a.c. voltage insulation. Only when a first secondary coil follows after a second secondary coil or the other way around, (which in the embodiment described is only the case for the coils 7C and 7D) the relevant insulating layer 9C has to satisfy more stringent requirements as regards the a.c. voltage insulation. To satisfy these requirements, it may be advantageous to omit the support 11 and, as is shown in FIG. 3, to provide a holder 25 between the coils 7C and 7D, which holder is made of an electrically insulating plastics material in which the diodes 13A, 13B, 13C are embedded. The thickness of this holder is obviously considerably larger than the thickness of the insulating layer 9C, so that it can provide a better insulation between the coils 7C and 7D. On the other hand, it is alternatively possible to embed the diodes 13A, 13B and 13C in the material of the secondary coil former 5.

When two consecutive secondary coils are part of the same section, they carry the same direct voltage so that no requirements need to be imposed on the direct voltage insulation properties of the intermediate insulating layer. In the embodiment described this is the case for the secondary coils 7C and 7D. All the other consecutive secondary coils in this embodiment belong to sections which are immediately subsequent to each other in the sequence of sections. Thus, the secondary coils 7A and 7B belong to the contiguous sections 19A and 19B. This implies that the insulating layers between these secondary coils, for example the insulating layer 9A, must be capable of resisting the direct voltage generated by one section. So in the embodiment described this is one third part of the direct voltage applied to the high-voltage terminal 23. In practice, this requirement can be satisfied comparatively easily. If secondary coils of the first section 19A and the last section 19C were immediately subsequent to each other, the intermediate insulating layer should be capable of resisting a twice higher direct voltage.

From the above it follows that the d.c. insulation requirement that every two consecutive secondary coils must belong to the same section or to sections which are immediately adjacent to each other in the sequence can be satisfied when, as shown in FIG. 2, the secondary coils are arranged in the sequence 7A, 7F, 7B, 7E, 7C, 7D. That sequence also meets the a.c. insulation requirement, because, a first and a second secondary coil are only adjacent to each other in one case (the coils 7C and 7D). Further possibilities for arranging the secondary coils, the same requirements being satisfied, are:

7F, 7A, 7E, 7B, 7D, 7C or 7D, 7C, 7E, 7B, 7F, 7A or 7C, 7D, 7B, 7E, 7A, 7F

When first and second secondary coils are allowed to follow each other in two or three cases, the number of possible sequences becomes significantly larger.

Figure 4:
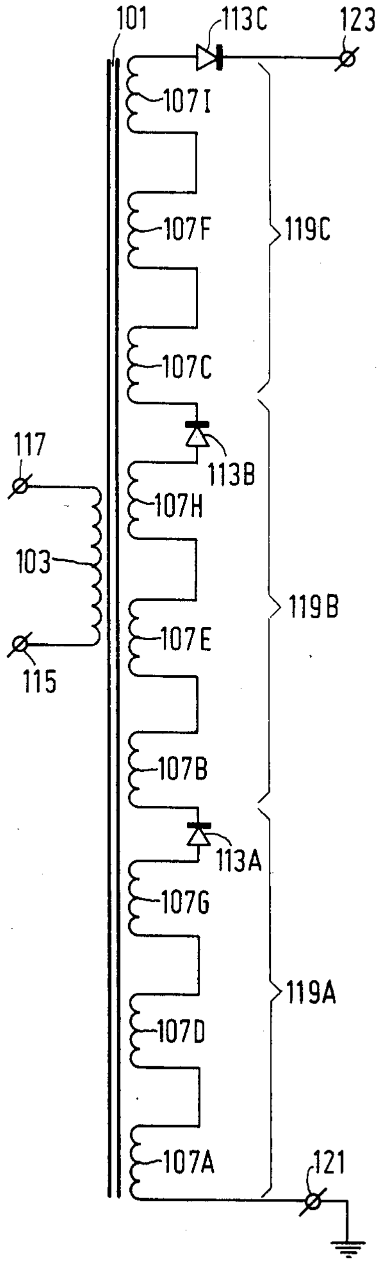
FIG. 4 is an electric circuit diagram of a third embodiment of a generator according to the invention.

In the embodiments described with reference to FIGS. 1, 2 and 3, the high-voltage section of the generator is formed by three sections, each comprising two secondary coils and a diode. It is however alternatively possible to opt for a different number of sections and/or a different number of secondary coils per section. FIG. 4 shows an electric circuit diagram of a generator having three sections and three secondary coils per section. The generator comprises a ferromagnetic core 101, on which a primary winding 103 is provided which is connected to input terminals 115, 117. In addition, a secondary winding is present comprising nine secondary coils 107A to 107I, which are wound concentrically with the same winding sense and substantially the same number of turns, the outermost secondary coil being denoted by 107A, the next one by 107B etc. The secondary coils 107A to 107I form part of a high-voltage portion formed by three sections 119A, 119B, 119C. Each section comprises three series-arranged secondary coils the third one of which is arranged in series with a diode. The diodes, which all have the same forward directions are denoted by the reference numerals 113A, 113B, 113C. The diode 113C of the third section 119C is connected to a high-voltage terminal 123. The first secondary coil 107A of the first section 119A is connected to a ground terminal 121. The sequence in which the secondary coils are arranged is 107A, 107D, 107G, 107B, 107E, 107H, 107C, 107F, 107I. It can be readily seen that then only in two cases an a.c. voltage occurs between two consecutive secondary coils, namely between the coils 107C and 107D and between the coils 107F and 107G. The first case relates to a first and a second secondary coil and the second case to a second and a third secondary coil. Also in this case several different sequences for arranging the secondary coils are of course possible, which all satisfy approximately the same requirements.

What is claimed is:

1. A generator for generating from a supplied a.c. voltage a direct voltage at a high-voltage terminal of the generator, such generator comprising a transformer having a ferromagnetic core with a primary and a secondary winding thereon, the secondary winding comprising a plurality of concentric coils wound on the core in the same winding senses and having substantially the same number of turns, a layer of insulating material being between each pair of adjacent coils; such generator being characterized in that the secondary winding has a plurality of sections, each section including at least two of said coils connected in series with a rectifier, said sections being connected in series such that all the rectifiers are in the same forward direction, the last section in the series sequence being connected to the high-voltage terminal and the number of coils per section being equal for all sections; a majority of the pairs of adjacent coils on said core being in corresponding serial positions in respective ones of said sections and the remaining such pairs being in consecutive serial positions in respective ones of said sections, thereby limiting the maximum a.c. voltage between adjacent coils.

2. A generator as claimed in claim 1, wherein a majority of the pairs of adjacent coils on said core are in the same or adjacent ones of said serially connected sections of the secondary winding, thereby limiting the maximum d.c. voltage between adjacent coils.

3. A generator as claimed in claim 1, characterized in that each section is formed by a series arrangement of, arranged one after the other, a first secondary coil, a second secondary coil and a rectifier.

4. A generator as claimed in claim 3, characterized in that all but one of the pairs of adjacent coils on said core are at the same serial positions in respective ones of said sections of the secondary winding.

5. A generator as claimed in claim 4, characterized in that all but two of the pairs of adjacent coils on said core are at the same or consecutive serial positions in respective ones of said sections of the secondary winding.

6. A generator as claimed in claim 1, characterized in that the layer of insulating material between the first and second immediately adjacent secondary coils is constituted by a holder made of an electrically insulating plastics material, in which the rectifiers are embedded.

7. A generator as claimed in claim 1, characterized in that each section is formed by a series arrangement of, arranged one after the other, a first secondary coil, a second secondary coil, a third secondary coil and a rectifier.

* * * * *